Figure 1:
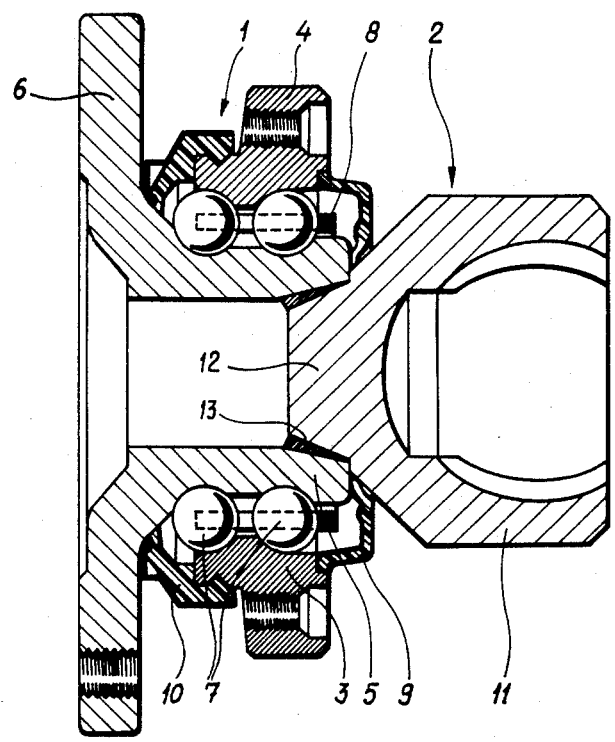

United States Patent [19]

Merkelbach

[11] Patent Number: 4,550,237
[45] Date of Patent: Oct. 29, 1985

[54] WHEEL HUB UNIT ASSEMBLIES

[75] Inventor: Boy Merkelbach, Utrecht, Netherlands

[73] Assignee: SKF Industrial Trading & Development Company B.V., Ab Nieuwegein, Netherlands

[21] Appl. No.: 541,378

[22] Filed: Oct. 13, 1983

Related U.S. Application Data

[63] Continuation-in-part of Ser. No. 259,018, Apr. 30, 1981, abandoned.

[30] Foreign Application Priority Data

May 9, 1980 [NL] Netherlands ............... 8002688

[51] Int. Cl.⁴ .................. B23K 26/00; B23K 15/00
[52] U.S. Cl. .................. 219/121 LD; 219/121 ED
[58] Field of Search ............. 219/121 LC, 121 LD, 219/121 EC, 121 ED

[56] References Cited

U.S. PATENT DOCUMENTS 3,694,616  9/1972  Brealey ................ 219/121 ED
4,330,911  5/1982  Kapaan et al. ......... 219/121 LM X

*Primary Examiner*—C. L. Albritton
*Attorney, Agent, or Firm*—Yuter, Rosen & Dainow

[57] ABSTRACT

A bearing assembly comprising a preloaded and adjusted rolling bearing having two rows of rolling elements, the races thereof being integral with attachment flanges, while the inner race is connected by means of an electron or laser beam weld to the outer ring of a homokinetic coupling, wherein the outer ring of the homokinetic coupling comprises a projecting part directed towards the bearing, which part protrudes into the inner race of the bearing and is connected to the inner race by means of the weld.

9 Claims, 2 Drawing Figures

WHEEL HUB UNIT ASSEMBLIES

This application is a continuation-in-part of copending application Ser. No. 259,018 filed Apr. 30, 1981, now abandoned.

The invention relates to a method for producing a bearing assembly of the type having a pre-loaded and adjusted rolling bearing with two rows of rolling elements, the races of which are integral with attachment flanges, and wherein the inner race is connected by an electron or laser beam weld to the outer ring of a universal joint. Such a bearing assembly is disclosed in British Pat. No. 1,539,108.

Bearing assemblies of this kind are used primarily for mounting the steerable wheels of a vehicle, in particular a vehicle with front-wheel drive, the assembly being ready for use as such and requiring only to be installed, since the bearing is pre-loaded, adjusted, furnished with a lubricant and sealed beforehand. The assembly is fastened to the vehicle by the attachment flange of the outer race, while the wheel hub is connected to the flange of the inner race.

Inasmuch as the bearing is completely adjusted as such before it is connected with the universal joint, when a welded connection is used between these two parts the heat evolved must not be allowed to adversely affect the bearing.

In the known bearing assemblies, a welded connection made by means of an electron beam is used, whereby only comparatively little heat is generated. This welded connection is made between annular parts projecting axially from the outer race of the universal joint and the inner face of the bearing, the end surfaces of which parts have equal dimensions and make contact with each other. However, the connection thus obtained between the bearing and the universal joint is comparatively weak, since welding flanges are used at the outermost edges of a bearing ring and coupling ring part.

The object of this invention is to provide a method for producing a bearing assembly of the above type, having a very strong connection produced by welding between and positioning of bearing and universal joint parts, the combination or unit itself being much more compact than known units of the same capacity.

The object is accomplished, in the method according to the invention, by providing the outer ring of the universal joint with a projecting part directed towards the bearing, protruding into the inner race of the bearing, and connecting the protruding part to the inner race by means of a weld produced by electron or laser beam.

The connection thus produced between the bearing and the universal joint is very strong since, in the welding of these parts, the electron or laser beam is directed inward from the open side of the inner race reaching a relatively large surface for the weld. In addition, parts of the bearing inner race and coupling member engage each other, to thereby improve the centering of these parts before welding. Due to the use of this type of connection, the welding has no influence on the bearing parts, e.g. its races, seals, etc.

Preferably the projecting part of the universal joint is a part tapered to converge axially outwardly, and the part of the inner surface of the inner race of the bearing that encloses this projecting part is correspondingly tapered to diverge axially outwardly.

If necessary, in order for the connection to be better able to assume tangential forces, at least one set of mutually cooperating projections and recesses may be arranged on the outer surface of the projecting part and the inner surface of the part of the inner race enclosing it. Preferably these cooperating parts have angular cross sections in order to improve the engagement of the parts.

Advantageously, an electric measuring device is arranged within the inner race, for measuring signals relating to the operation of the bearing assembly and transmitting the results of the measurements to suitable devices external of the bearing assembly.

A recess may also be provided in the inside wall of the inner race for attaching a fastening means for a hub cap or other trim.

British Pat. No. 1,358,842 discloses a bearing assembly comprising a rolling bearing having two rows of rolling elements, the recess of which is integral with attachment flanges, and a universal joint, the outer ring of the joint being connected by an electron or laser beam weld to the inner race of the bearing. This weld connects the end of the inner race of the bearing away from the attachment flange in question to an annular part, enclosing said end of the outer ring of the universal joint, in which annular part likewise the inner race of one of the rows of rolling elements is formed. Accordingly, the bearing comprises an inner race part consisting of two different elements which require close fits and high tolerances, i.e. extremely difficult manufacturing processes. In addition, preloading and adjusting of these parts must be carried out during the welding process. This process requires great skill. Furthermore, in the production of this known bearing assembly, the electron or laser beam is directed inward from the same side of the bearing as the side on which the universal joint is arranged which urges dismounting of the coupling parts.

Figure 2:
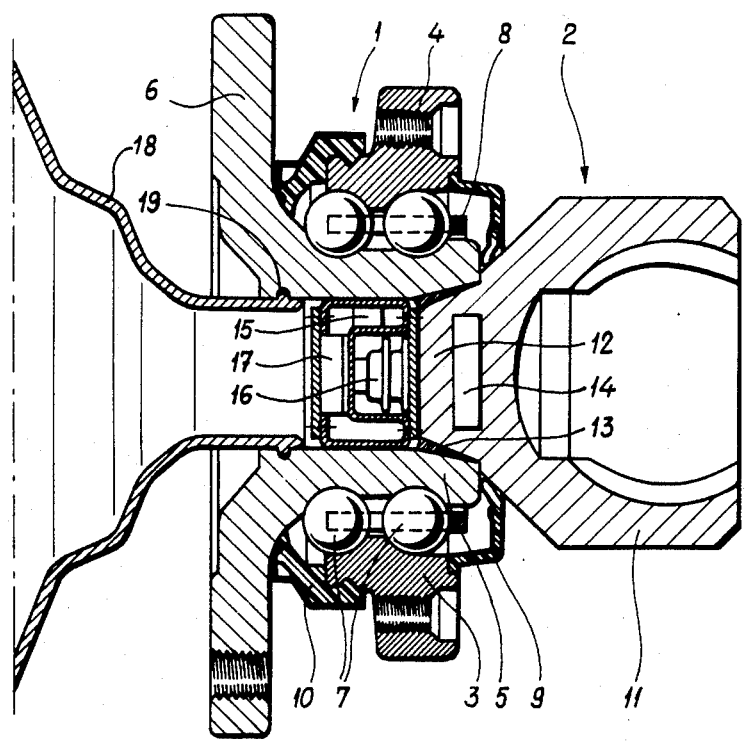

The invention will now be described in more detail with reference to the drawings wherein:

FIG. 1 is a longitudinal cross-sectional view of a bearing assembly according to the invention; and FIG. 2 is a longitudinal cross-sectional view of a modification of the assembly of FIG. 1.

As shown in FIG. 1, the assembly comprises a ball bearing 1 and a universal joint 2 connected therewith. The bearing comprises an outer race 3 with a flange 4 integral therewith and an inner race 5 with a flange 6 integral therewith. Between the races 3 and 5, two rows of rolling elements 7 are situated and held separate from each other by a cage 8. Sealing rings 9 and 10 are provided so that the bearing 1 forms a pre-loaded, adjusted, lubricated and sealed unit.

Only the outer ring 11 of the universal joint 2 is shown, the ring 11 having an axially projecting portion 12 positioned within the inner race 5 of the bearing. The portion 12 converges conically towards its axial end, relative to the ring 11. The portion of the interior surface of the inner race 5 that encloses this projecting portion 12 is correspondingly tapered, while a weld 13 produced by an electron or laser beam connects the projecting portion 12 to the inner race 5.

As shown in FIG. 2, projections 14 of triangular cross section may be formed additionally on the periphery of the projecting portion 12, to engage matching recesses in the interior surface of the inner race 5.

In the inner race, an electronic measuring means may be arranged, for example comprising an electronic voltage comparator 16 and a chemical indicator 17, which changes color upon each instance on occurrence of a shock impulse above a certain threshhold value, so that the extent to which, within a given lapse of time, the indicator 17 has changed color, is a measure of the action of the assembly.

Advantageously also, a hub cap or other trim 18 may be secured to the rim of the wheel with the aid of a fastening means (for example a bolt) located in a groove 19 in the bore of the inner race and capable of being fixed therein. In the example of FIG. 2, a projection on the hub cap 18 itself constitutes the fastening means.

In the method in accordance with the invention, referring to FIG. 1, a conventional electron or laser beam welding device is directed from the left hand side of the bore of the inner race 5 to the junction between the ring 11 of the universal joint and the inner race 5 of the bearing. As illustrated in FIG. 1, portion 12 of the universal joint tapers more sharply than the right hand end of the inner race, so that a gap having a wedge-shaped cross section is provided between these elements, the large end of the gap terminating in the bore of the inner race. As a consequence, the electron or laser beam may extend into this gap, to completely weld the inner race 5 and projecting portion 12 together throughout the region of the wedge-shaped gap. As a consequence, the weldment securely holds these two elements together throughout a very large area of their adjoining faces, resulting in the production of a very strong weld. The use of electron or laser beam welding for this purpose overcomes any problem of damage to the bearing by overheating.

Conventional laser or electron beam welding devices may be employed for practicing the method of the invention.

While the invention has been disclosed and described with reference to a limited number of embodiments, it is apparent that variations and modifications may be made therein, and it is therefore intended in the following claims to cover each variation and modification as follows within the true spirit and scope of the invention.

What is claimed is:

1. A method for joining a bearing assembly with an axially extending part of the outer element of a universal joint, the bearing assembly including an outer race, an inner race ring with opposite first and second ends and an axial bore therethrough and an attachment flange at said first end, and at least one annular row of rolling elements between said outer and inner races, the improvement comprising former a taper in said axial bore at said second end of said innter race to define a surface diverging in the axial direction toward said second end, forming said axially extending part of said outer element to define a tapered surface converging conically for conforming to and fitting in said axial bore at said tapered second end, inserting said tapered extending part into and adjacent to the surface of said tapered axial bore, and directing one of an electron and laser beam inward through said first end of said inner race to said second end and welding together with said beam said adjacent tapered surfaces of said extending part and second end respectively.

2. The method of claim 1 wherein said step of forming said axially extending part of said outer elements to define a tapered surface comprises forming said outer element to define a tapered surface that tapers at an angle to the axis of said bearing assembly greater than the angle between said axis and the tapered surface on said second end of said inner race.

3. A method as claimed in claim 1, wherein a gap of extended depth in the axial direction is formed between said tapered surfaces after said insertion of said tapered extending part, said welding filling said gap.

4. A method as claimed in claim 2, wherein a gap of extended depth in the axial direction is formed between said tapered surfaces after said insertion of said tapered extending part, the cross section of said gap being wedge-shaped, said welding filling said gap.

5. A method as claimed in claim 1, and further comprising the step of forming a shoulder radially extending from said tapered surface of said outer element, said insertion of said extending part being limited axially by abuttment of said second end against said shoulder.

6. A method as claimed in claim 1, wherein the weldment between said adjacent tapered surfaces is in the form of a hollow truncated cone.

7. A method as claimed in claim 2, wherein the weldment between said adjacent tapered surfaces is in the general form of a hollow truncated cone.

8. A method as claimed in claim 1, and further comprising the step of forming projections from the periphery of said extending part and forming recesses in said tapered bore opening to match said projections from said extending part, said projections seating in said recesses when said extending part is inserted into said tapered axial bore of said inner race.

9. A method as claimed in claim 2, and further comprising the step of forming projections from the periphery of said extending part and forming recesses in said tapered bore opening to match said projections from said extending part, said projections seating in said recesses when said extending part is inserted into said tapered axial bore of said inner race.

* * * * *

UNITED STATES PATENT AND TRADEMARK OFFICE
CERTIFICATE OF CORRECTION

PATENT NO. : 4,550,237

DATED : October 29, 1985

INVENTOR(S) : MERKELBACH

It is certified that error appears in the above-identified patent and that said Letters Patent is hereby corrected as shown below:

Column 3, line 50, change "former" to --forming--.

Column 3, line 51, change "innter" to --inner--.

Signed and Sealed this

First Day of July 1986

[SEAL]

Attest:

DONALD J. QUIGG

Attesting Officer

Commissioner of Patents and Trademarks